United States Patent
King et al.

(10) Patent No.: US 10,804,577 B2
(45) Date of Patent: Oct. 13, 2020

(54) BATTERY PACK ARRAY FRAME DESIGNS THAT EXCLUDE THERMAL FINS

(71) Applicant: FORD GLOBAL TECHNOLOGIES, LLC, Dearborn, MI (US)

(72) Inventors: Kimberley King, Northville, MI (US); Steve F. Chorian, Canton, MI (US); Saravanan Paramasivam, South Lyon, MI (US); Rajaram Subramanian, Ann Arbor, MI (US); Bhaskara Boddakayala, Troy, MI (US); Steve Droste, Ypsilanti, MI (US); Mladen Marjanovic, Windsor (CA)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 274 days.

(21) Appl. No.: 15/633,955

(22) Filed: Jun. 27, 2017

(65) Prior Publication Data

US 2018/0375179 A1 Dec. 27, 2018

(51) Int. Cl.
| | |
|---|---|
| *H01M 10/613* | (2014.01) |
| *H01M 10/625* | (2014.01) |
| *H01M 10/6554* | (2014.01) |
| *H01M 2/10* | (2006.01) |
| *H01M 10/6555* | (2014.01) |

(52) U.S. Cl.
CPC ....... *H01M 10/613* (2015.04); *H01M 2/1016* (2013.01); *H01M 2/1077* (2013.01); *H01M 10/625* (2015.04); *H01M 10/6554* (2015.04); *H01M 10/6555* (2015.04); *H01M 2220/20* (2013.01)

(58) Field of Classification Search
CPC ............ H01M 2/1016; H01M 10/613; H01M 10/6554
USPC ......................................................... 429/120
See application file for complete search history.

(56) References Cited

U.S. PATENT DOCUMENTS

| | | | |
|---|---|---|---|
| 8,574,740 B2 | 11/2013 | Quick et al. | |
| 8,968,906 B2 | 3/2015 | Hsu et al. | |
| 9,172,122 B2 | 10/2015 | Yum et al. | |
| 9,203,064 B2 | 12/2015 | Lee et al. | |
| 2011/0200862 A1* | 8/2011 | Kurosawa | H01M 2/1016 429/120 |
| 2012/0040223 A1 | 2/2012 | Odumodu | |
| 2014/0154532 A1* | 6/2014 | Chellew | H01M 2/105 429/7 |
| 2015/0266387 A1 | 9/2015 | Garfinkel et al. | |
| 2015/0287968 A1* | 10/2015 | Maguire | H01M 2/18 429/148 |
| 2016/0020496 A1 | 1/2016 | Burrows et al. | |
| 2016/0036019 A1 | 2/2016 | Gunna et al. | |

(Continued)

FOREIGN PATENT DOCUMENTS

WO 2013/183945 A1 12/2013

*Primary Examiner* — James M Erwin
(74) *Attorney, Agent, or Firm* — David B. Kelley; Carlson, Gaskey & Olds

(57) ABSTRACT

A battery pack includes a heat dissipating structure, an array frame positioned against the heat dissipating structure, and a battery cell retained by the array frame and arranged so at least one surface of the battery cell is exposed by the array frame and is contiguous with the heat dissipating structure. The heat dissipating structure may be a heat exchanger plate or a thermal interface material (TIM).

22 Claims, 10 Drawing Sheets

(56) References Cited

U.S. PATENT DOCUMENTS

2016/0133883 A1\* 5/2016 Hwang ............... H01M 2/0292
429/176
2016/0133997 A1 5/2016 Vejalla et al.

\* cited by examiner

BATTERY PACK ARRAY FRAME DESIGNS THAT EXCLUDE THERMAL FINS

TECHNICAL FIELD

This disclosure relates to battery packs for electrified vehicles. An exemplary battery pack includes an array frame for retaining at least one battery cell. The battery cell is positioned within the array frame such that at least one surface of the battery cell is contiguous with either a thermal interface material or a heat exchanger plate of the battery pack.

BACKGROUND

The desire to reduce automotive fuel consumption and emissions is well documented. Therefore, vehicles are being developed that reduce or completely eliminate reliance on internal combustion engines. Electrified vehicles are currently being developed for this purpose. In general, electrified vehicles differ from conventional motor vehicles because they are selectively driven by one or more battery powered electric machines. Conventional motor vehicles, by contrast, rely exclusively on the internal combustion engine to propel the vehicle.

A high voltage battery pack typically powers the electric machines and other electrical loads of the electrified vehicle. The battery pack includes a plurality of battery cells that store energy for powering these electrical loads. The battery cells generate heat, such as during charging and discharging operations. In some battery packs, the battery cells are thermally managed using thermal fins that are positioned in contact with the cells.

SUMMARY

A battery pack according to an exemplary aspect of the present disclosure includes, among other things, a heat dissipating structure, an array frame positioned against the heat dissipating structure, and a battery cell retained by the array frame and arranged so at least one surface of the battery cell is exposed by the array frame and is contiguous with the heat dissipating structure.

In a further non-limiting embodiment of the foregoing battery pack, the heat dissipating structure is a heat exchanger plate.

In a further non-limiting embodiment of either of the foregoing battery packs, the heat dissipating structure is a thermal interface material (TIM).

In a further non-limiting embodiment of any of the foregoing battery packs, the TIM is disposed between the surface of the battery cell and a heat exchanger plate.

In a further non-limiting embodiment of any of the foregoing battery packs, the array frame is rectangular shaped and includes a top wall, a support beam, and frame arms that extend between the top wall and the support beam.

In a further non-limiting embodiment of any of the foregoing battery packs, the support beam separates a first portion of the battery cell from a second portion of an adjacent battery cell.

In a further non-limiting embodiment of any of the foregoing battery packs, the support beam includes a triangular shaped cross section.

In a further non-limiting embodiment of any of the foregoing battery packs, the top wall includes a first width and the support beam includes a second width that is a smaller width than the first width.

In a further non-limiting embodiment of any of the foregoing battery packs, the support beam includes a hard plastic material that is overmolded with a soft plastic material.

In a further non-limiting embodiment of any of the foregoing battery packs, the array frame is three-sided and includes a top wall and frame arms that extend from the top wall.

In a further non-limiting embodiment of any of the foregoing battery packs, the surface of the battery cell is a bottom surface.

In a further non-limiting embodiment of any of the foregoing battery packs, the surface of the battery cell is completely uncovered by any portion of the array frame.

In a further non-limiting embodiment of any of the foregoing battery packs, a battery assembly positioned against the heat dissipating structure, the battery assembly comprising the array frame, the battery cell, and a plurality of additional array frames and battery cells.

In a further non-limiting embodiment of any of the foregoing battery packs, the array frame extends along a longitudinal axis, and a thermally conductive path of the battery cell extends in parallel with the longitudinal axis along a length of a side face of the battery cell.

In a further non-limiting embodiment of any of the foregoing battery packs, the array frame excludes a thermal fin positioned in contact with the battery cell.

A method according to another exemplary aspect of the present disclosure includes, among other things, retaining a battery cell within an array frame of a battery assembly such that at least one surface of the battery cell is contiguous with either a thermal interface material (TIM) or a heat exchanger plate.

In a further non-limiting embodiment of the foregoing method, the at least one surface is exposed through the array frame.

In a further non-limiting embodiment of either of the foregoing methods, the at least one surface is a bottom surface of the battery cell.

In a further non-limiting embodiment of any of the foregoing methods, wherein the battery assembly is positioned atop the heat exchanger plate, and the TIM is disposed between the battery assembly and the heat exchanger plate.

In a further non-limiting embodiment of any of the foregoing methods, the battery assembly excludes any thermal fins.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details various battery pack designs for use within electrified vehicles. An exemplary battery pack includes a heat exchanger plate, an array frame positioned relative to the heat exchanger plate, a thermal interface material (TIM) disposed between the heat exchanger plate and the array frame, and a battery cell retained by the array frame. At least one surface of the battery cell is in direct contact with either the heat exchanger plate or the TIM. These and other features are discussed in greater detail in the following paragraphs of this detailed description.

Figure 1:
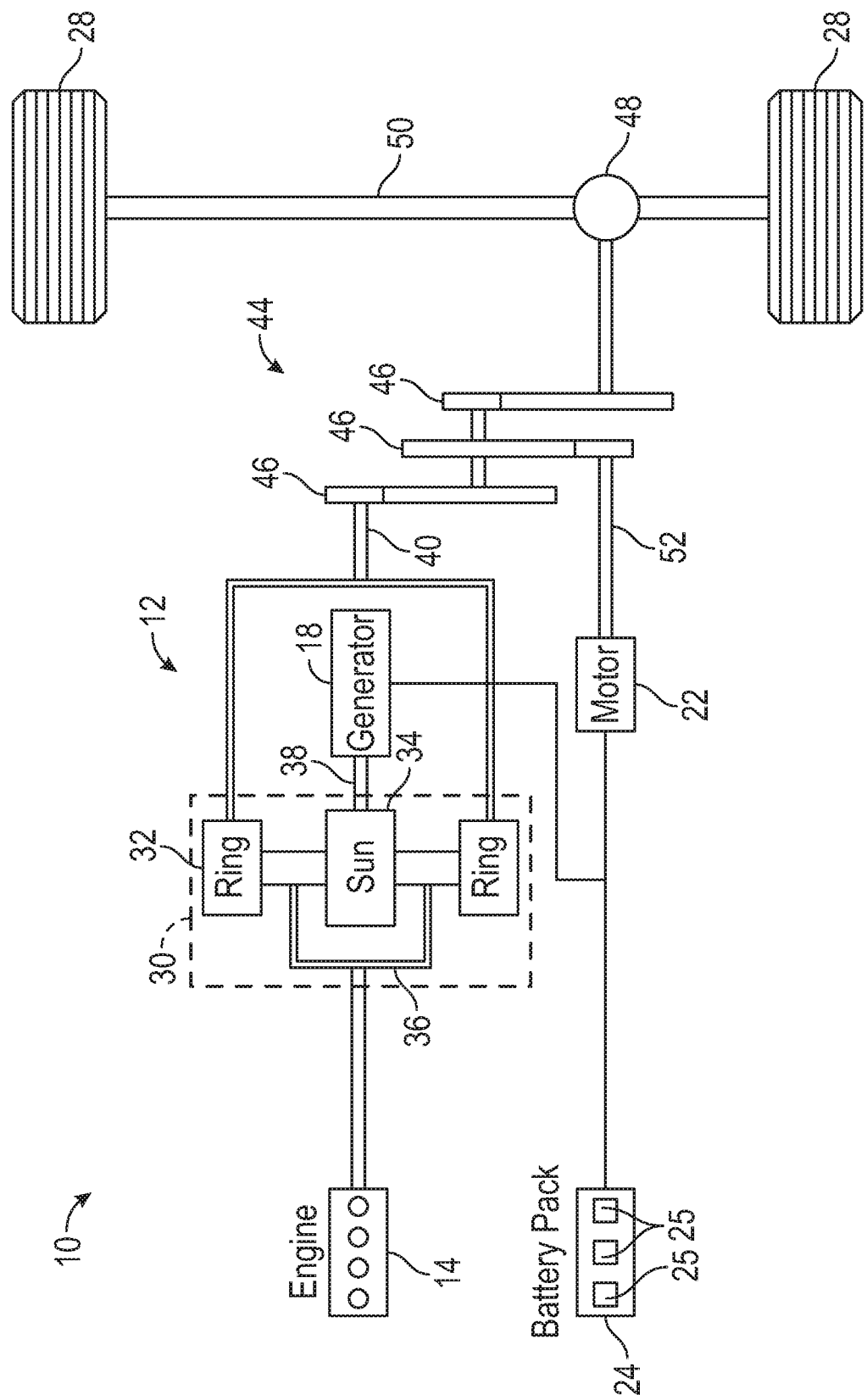
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's), battery electric vehicles (BEV's), fuel cell vehicles, etc.

In a non-limiting embodiment, the powertrain 10 is a power-split powertrain system that employs first and second drive systems. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22, the generator 18, and/or other electrical loads of the electrified vehicle 12. Other types of energy storage devices and/or output devices could also be used to electrically power the electrified vehicle 12.

In a non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
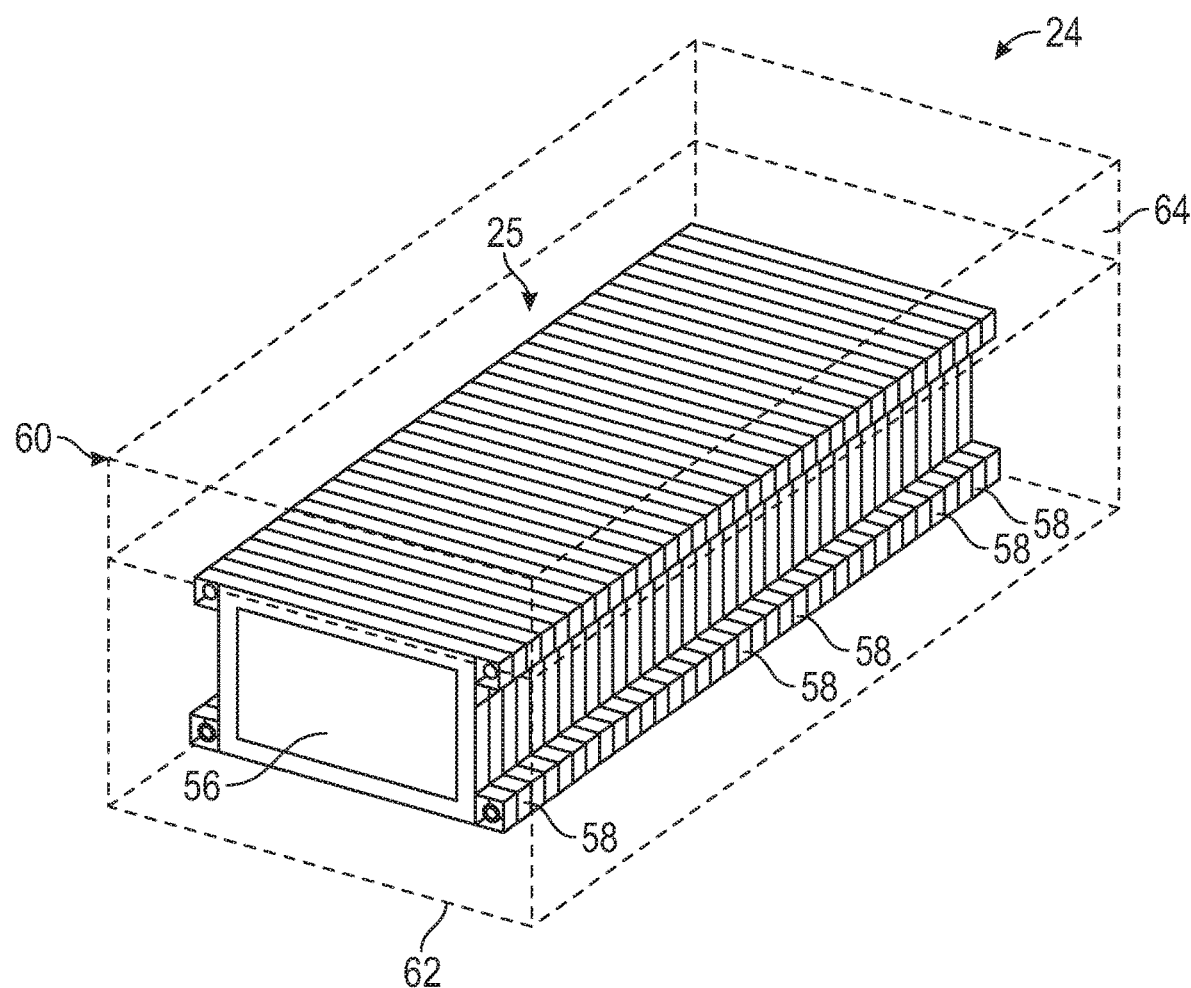
FIG. 2 illustrates a battery pack of an electrified vehicle.

FIG. 2 schematically illustrates a battery pack 24 that can be employed within an electrified vehicle. For example, the battery pack 24 could be part of the powertrain 10 of the electrified vehicle 12 of FIG. 1. FIG. 2 is a perspective view of the battery pack 24, and its external components (e.g., enclosure assembly 60) are shown in phantom to better illustrate some of the internal components of the battery pack 24.

The battery pack 24 includes a plurality of battery cells 56 that store electrical power for powering various electrical loads of the electrified vehicle 12. The battery pack 24 could employ any number of battery cells within the scope of this disclosure, and this disclosure is not limited to the exact configuration shown in FIG. 2.

The battery cells 56 may be stacked side-by-side to construct a grouping of battery cells 56, sometimes referred to as a "cell stack." The battery pack 24 can include one or more separate groupings of battery cells 56. The battery cells 56 may include any geometry (prismatic, cylindrical, pouch, etc.) and any chemistry (lithium-ion, nickel-metal hydride, lead-acid, etc.).

The battery cells 56, along with any support structures (e.g., array frames, spacers, rails, walls, plates, bindings, etc.), may collectively be referred to as a battery assembly 25. In an embodiment, the battery cells 56 are retained relative to one another by a plurality of interconnected array frames 58. Although the battery pack 24 of FIG. 2 is depicted as having a single battery assembly 25, the battery pack 24 could include a greater number of battery assemblies within the scope of this disclosure. In addition, although depicted as extending longitudinally inside the battery pack 24, the battery assembly 25 could alternatively be arranged to extend laterally or horizontally inside the battery pack 24.

An enclosure assembly 60 houses each battery assembly 25 of the battery pack 24. In a non-limiting embodiment, the enclosure assembly 60 is a sealed enclosure that includes a tray 62 and a cover 64. The cover 64 is secured to the tray 62 to enclose and seal the battery assembly 25 of the battery pack 24.

Figure 3:
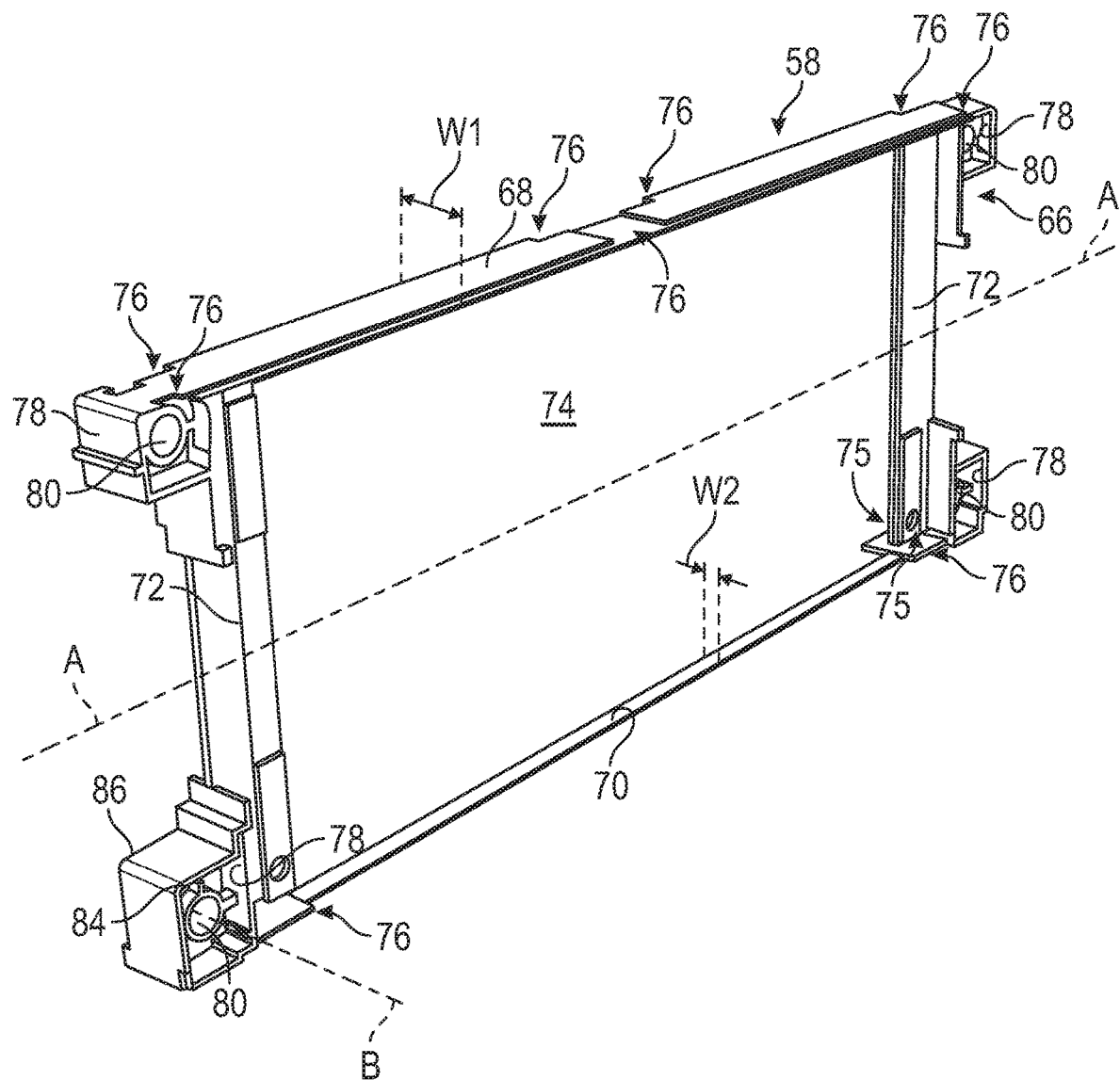
FIG. 3 illustrates an exemplary array frame of a battery assembly.

FIG. 3 illustrates an exemplary array frame 58 of the battery assembly 25 of FIG. 2. The array frame 58 includes a frame body 66 disposed along a longitudinal axis A. The frame body 66 may be rectangular shaped (i.e., four sided) and includes a top wall 68, a support beam 70, and frame arms 72 that connect between the top wall 68 and the support beam 70. In an embodiment, the frame arms 72 are disposed at the longitudinal extents of the top wall 68 and the support beam 70. The top wall 68, the support beam 70, and the frame arms 72 establish a perimeter around an opening 74 formed through the frame body 66. In an embodiment, the top wall 68 and the support beam 70 extend horizontally and in parallel with the longitudinal axis A, and the frame arms 72 extend vertically and transverse to the longitudinal axis A.

The frame body 66 of the array frame 58 may be a unitary, plastic structure. In a non-limiting embodiment, the top wall 68, the support beam 70, and the frame arms 72 are molded, cast, machined or otherwise manufactured to form the unitary structure.

Each opposing side of the frame body 66 includes a pocket 75. The pockets 75 may be sized and shaped to receive a battery cell (see feature 56 of FIGS. 4 and 5, for example). The array frame 58 may house either one or two battery cells, with each pocket 75 being capable of receiving a single battery cell. In an embodiment, the battery cells 56 are pouch cells suitable for a high voltage battery assembly. A non-limiting example of a suitable pouch battery cell is a lithium-ion battery. However, other types of battery cells are also contemplated within the scope of this disclosure.

In another embodiment, the top wall 68 of the frame body 66 includes a first width W1 and the support beam 70 of the frame body 66 includes a second width W2. The second width W2 is a smaller width than the first width W1. Thus, as discussed in greater detail below, at least one surface of a battery cell that is held within the frame body 66 of the array frame 58 may be exposed for direct contact with other structures, such as a heat dissipating structure.

A plurality of retention features 76 may be integrated into the top wall 68 and/or the frame arms 72 of the frame body 66 for connecting the array frame 58 to adjacent array frames. The retention features 76 may engage (e.g., snap into) corresponding retention features of adjacent array frames to build a battery assembly. It should be understood that the battery assemblies of this disclosure are not limited to any specific number of array frames or battery cells.

The array frame 58 may additionally include one or more fastener housings 78. The fastener housings 78 are integrated features of the frame body 66 of the array frame 58. The fastener housings 78 may protrude from the frame arms 72 in a direction away from the opening 74 of the frame body 66. In a non-limiting embodiment, the fastener housings 78 are disposed at both ends of the frame arms 72 (e.g., near a junction between the frame arms 72 and the top wall 68 and near the junction between the frame arms 72 and the support beam 70).

Each fastener housing 78 includes an opening 80. The opening 80 extends through the fastener housing 78. For example, the opening 80 may extend along an axis B between opposing side walls 84, 86 of the fastener housing 78. In an embodiment, the axis B is perpendicular to the longitudinal axis A. Each opening 80 is configured to receive a rod 82 (see, e.g., FIG. 5). The rod 82 may be inserted through the opening 80 of the fastener housing 78 to connect the array frame 58 with additional array frames of a battery assembly. The rod 82 functions to impart compression across such a battery assembly.

Figure 4:
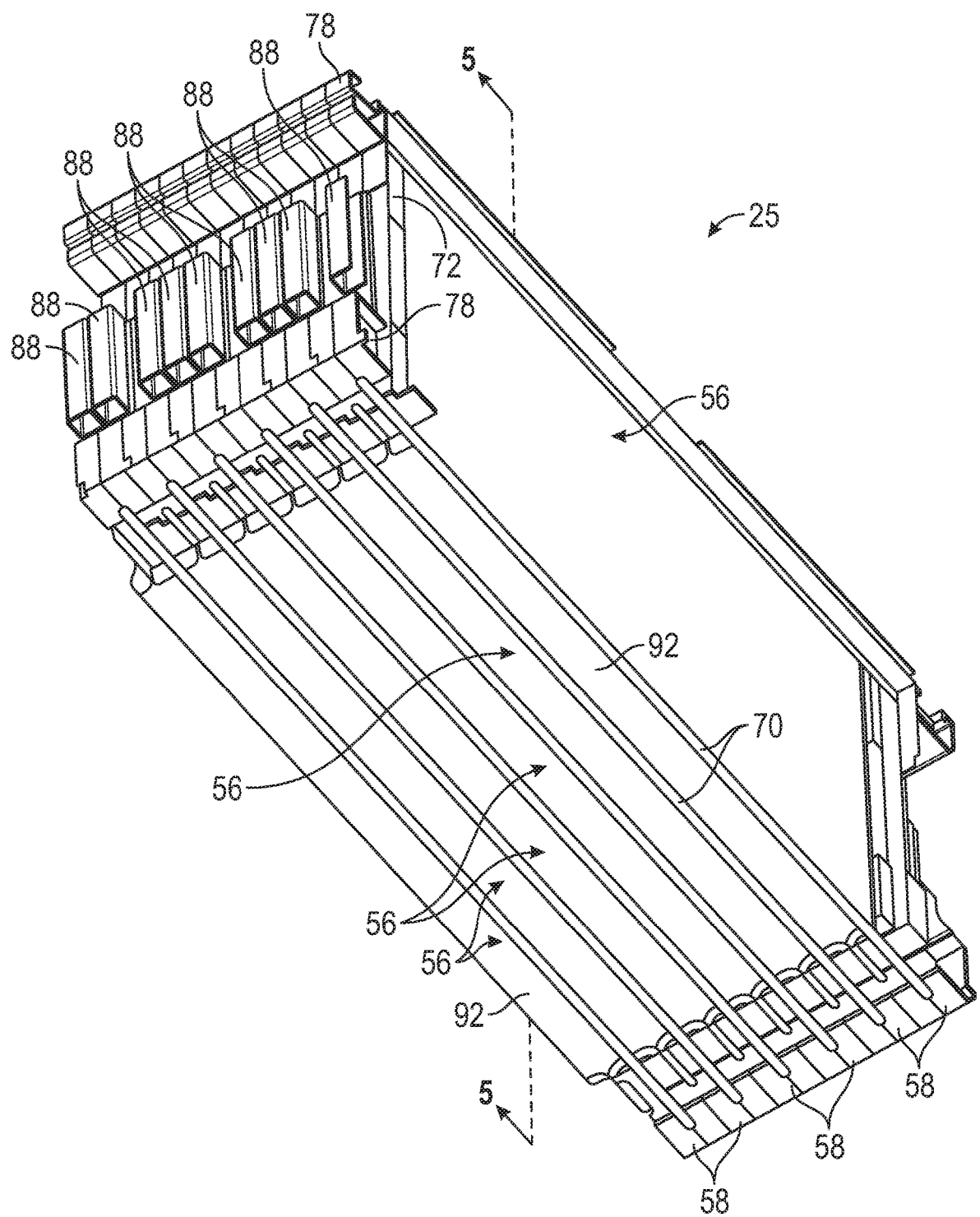
FIGS. 4 and 5 illustrate a battery assembly that includes a grouping of battery cells and interconnected array frames.
Figure 5:
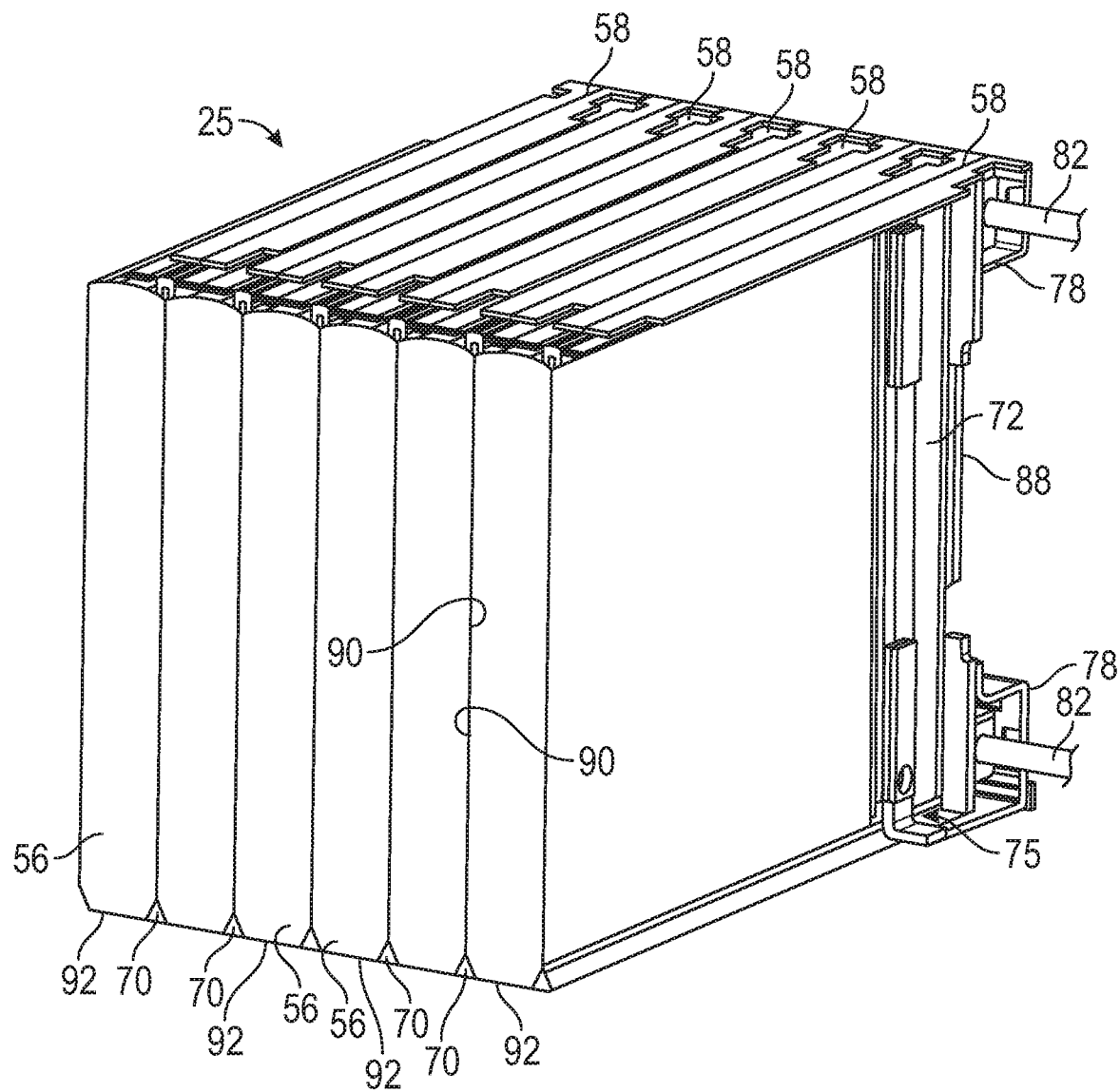

Referring now to FIGS. 4 and 5, a plurality of the array frames 58 may be stacked side-by-side to build a battery assembly 25. Each array frame 58 of the battery assembly 25 may accommodate two battery cells 56. Terminals 88 of the battery cells 56 protrude laterally outwardly from the frame arms 72 of the array frames 58 once positioned within the array frames 58. For example, the terminals 88 may be positioned vertically between the fastener housings 78 of each array frame 58.

Once received within the pockets 75 of the array frames 58, the battery cells 56 may contact one another along their side faces 90. The support beam 70 of each array frame 58 may be positioned axially between two adjacent battery cells 56 of the battery assembly 25. The bottom sections of each battery cell 56 are thus separated (i.e., non-contiguous) from one another by the support beams 70.

In an embodiment, as best shown in FIG. 5, the support beams 70 have a triangular cross-sectional shape for retaining the battery cells 56 relative to the array frames 58. Other shapes are also contemplated within the scope of this disclosure. The top wall 68 may also include battery cell support features.

The battery cells 56 are arranged relative to the support beams 78 such that at least one surface 92 of each battery cell 56 is exposed through the array frames 58. In an embodiment, the surface 92 is a bottom surface of the battery cell 56. To achieve this exposed design, the support beams 70 are positioned axially between adjacent battery cells 56 but do not extend underneath of the battery cells 56.

In another embodiment, the support beams 70 are made of a harder material that is overmolded with a softer material. For example, the support beams 70 could be made of a relatively hard plastic material (e.g., High-density polyethylene (HDPE)) that is overmolded with a relatively softer plastic material (e.g., urethane foam). Other materials are also contemplated within the scope of this disclosure.

During certain conditions, such as charging and discharging operations, a relatively significant amount of heat can be generated by the battery cells 56 of the battery assembly 25. It may be desirable to manage this heat to improve the capacity and life of the battery cells 56 and thereby improve the operation and efficiency of the battery pack 24. Some known battery assemblies manage the heat generated by the battery cells 56 using one or more thermal fins (e.g., strips of aluminum or other metallic material) that are received within the array frames 58 and are positioned in direct contact with the battery cells 56. The battery assemblies 25 of this disclosure, however, exclude any thermal fins. Instead, as discussed in greater detail below, the battery cells 56 may be thermally managed by taking advantage of their internal component construction.

Figure 6:
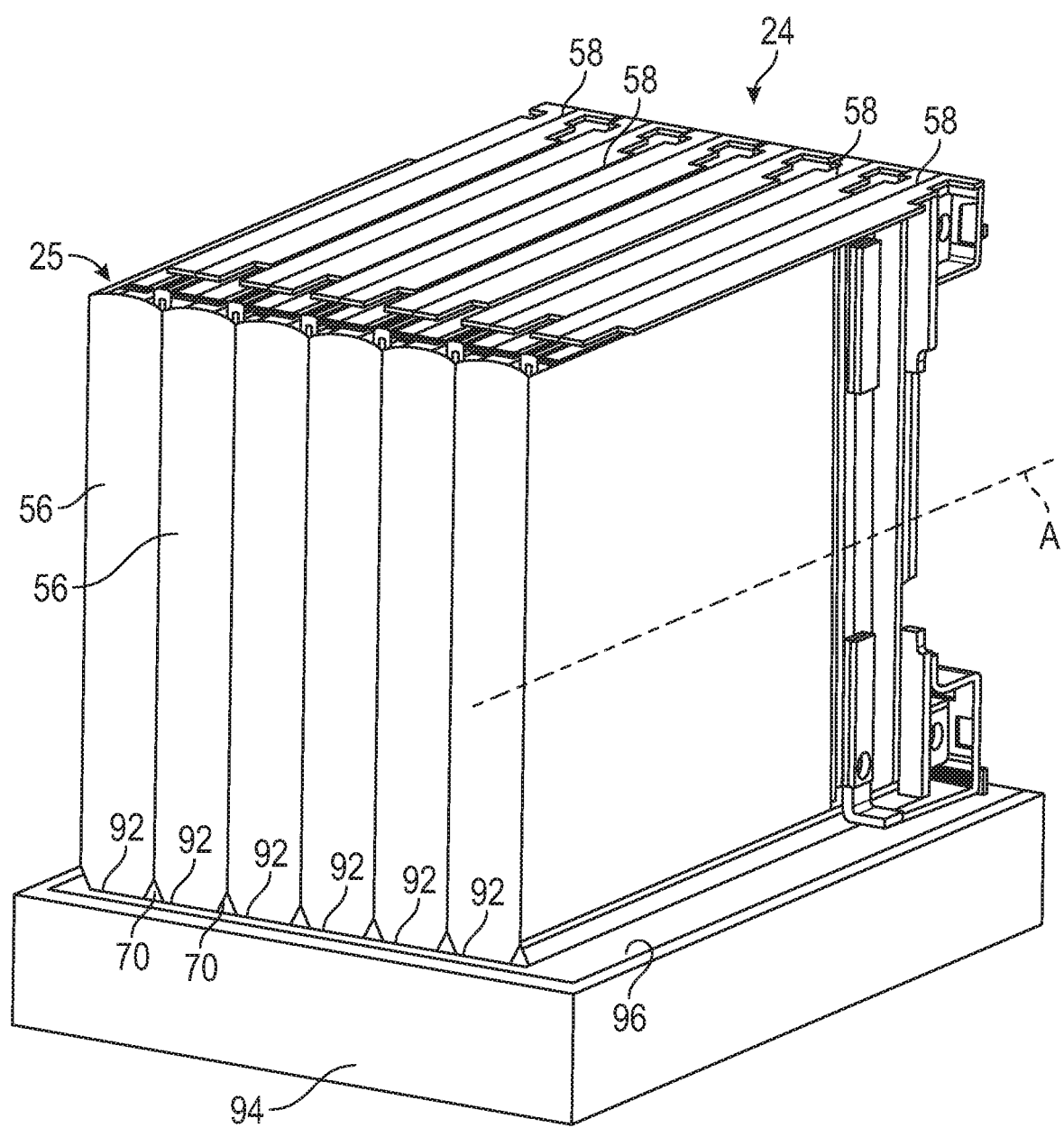
FIG. 6 is a cross-sectional view depicting portions of a battery pack that includes the battery assembly of FIGS. 4 and 5.

FIG. 6 illustrates portions of a battery pack 24 that includes a battery assembly 25 having a plurality of battery cells 56 held within array frames 58. The battery assembly 25, and thus the battery cells 56 and array frames 58, may be positioned on top of a heat exchanger plate 94, which may be referred to as a cold plate. The heat exchanger plate 94 may be part of the tray 62 of the enclosure assembly 60 (see FIG. 2) of the battery pack 24, or could be a separate structure positioned within the enclosure assembly 60. The heat exchanger plate 94 may be made of a metallic material, such as aluminum, for example.

In an embodiment, the exposed surfaces 92 of each battery cell 56 are contiguous with, or in direct contact with, the heat exchanger plate 94. The heat exchanger plate 94 is configured to conduct heat out of the battery cells 56. In other words, the heat exchanger plate 94 acts as a heat sink to remove heat from the heat sources (i.e., the battery cells 56) during certain conditions. The heat exchanger plate 94 could alternatively be configured to add heat to the battery cells 56, such as during relatively cold ambient conditions.

In another embodiment, a thermal interface material (TIM) 96 is disposed between the battery assembly 25 and the heat exchanger plate 94 such that the exposed surfaces 92 of the battery cells 56 are in direct contact with the TIM 96. The TIM 96 maintains thermal contact between the battery cells 56 and the heat exchanger plate 94 and increases the thermal conductivity between these neighboring components during heat transfer events. The TIM 96 may be any known thermally conductive material.

As alluded to above, the heat generated by the battery cells 56 of the battery assembly 25 is thermally managed without positioning thermal fins between the battery cells 56. This can be achieved by taking advantage of the internal component construction of the battery cells 56. For example, the battery cells 56 may include internal electrode cells or folds that wrap around a horizontal axis that is generally parallel to the longitudinal axis A of each array frame 58. Each battery cell 56 therefore includes a thermally conductive path that runs parallel to the longitudinal axis A along the length of the side faces 90 of the battery cells 56 rather than laterally from battery cell-to-battery cell. By exposing the surfaces 92 through the array frames 58, the surfaces 92 can be positioned in direct contact with either the heat exchanger plate 94 or the TIM 96. Since the battery cells 56 contact the heat dissipating device along the same direction of the thermal conductive path, heat can be efficiently transferred between the battery cells 56 and the heat exchanger plate 94 without requiring the use of thermal fins.

Figure 7:
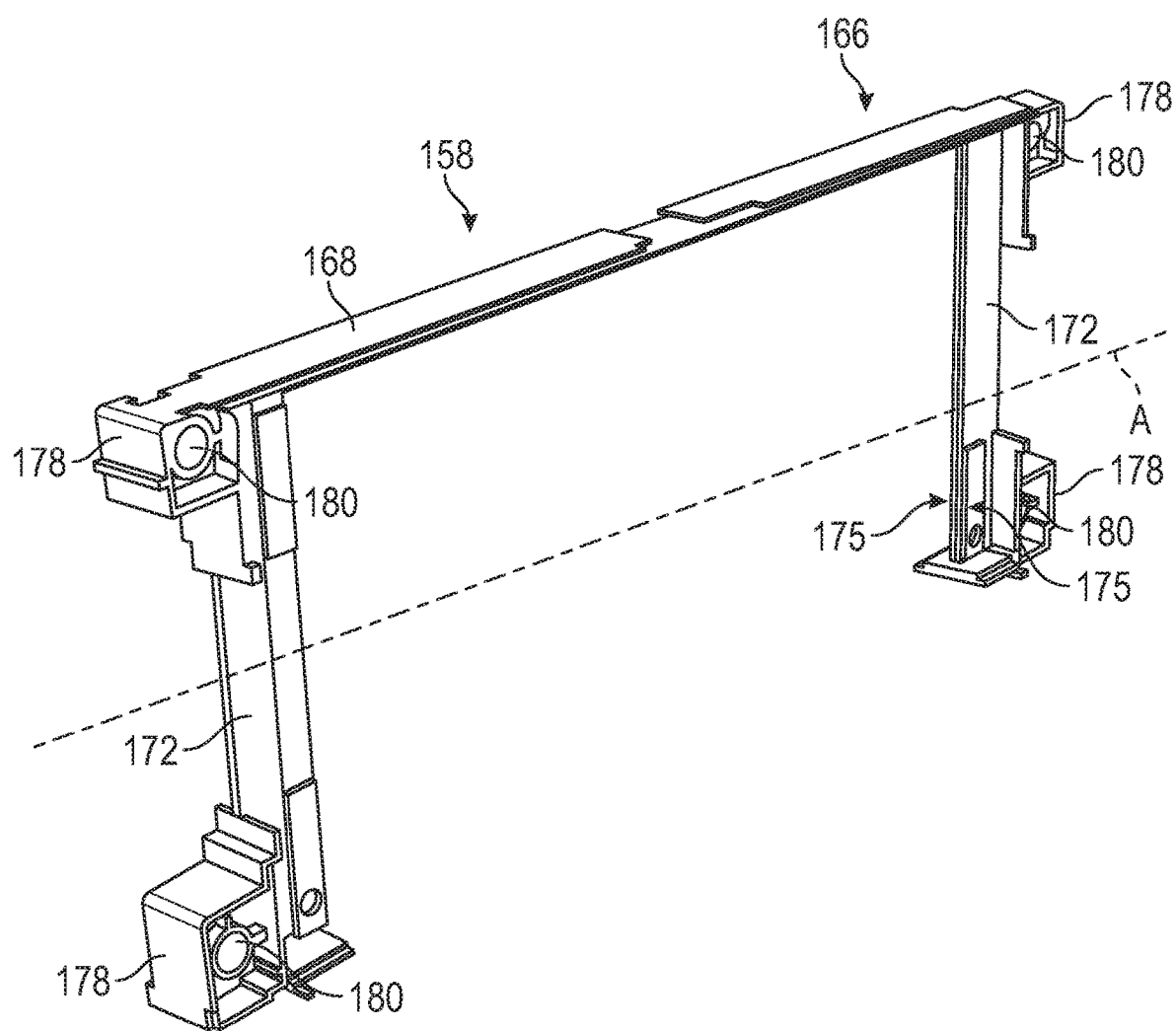
FIG. 7 illustrates another exemplary array frame of a battery assembly.

FIG. 7 illustrates another exemplary array frame 158 that can be utilized within of a battery assembly of a battery pack. The array frame 158 includes a frame body 166 disposed along a longitudinal axis A. The frame body 166 may be three-sided and includes a top wall 168 and frame arms 172 that extend transversely from the top wall 168. In this embodiment, the frame body 166 lacks any support beam on an opposite end of the frame arms 172 from the top wall 168. In an embodiment, the top wall 168 extends horizontally and in parallel with the longitudinal axis A, and the frame arms 172 extend vertically and transverse to the longitudinal axis A.

The frame body 166 of the array frame 58 may be a unitary, plastic structure. In an embodiment, the top wall 168 and the frame arms 172 are molded, cast, machined or otherwise manufactured to form the unitary structure.

Each opposing side of the frame body 66 includes a pocket 175. The pockets 175 may be sized and shaped to accommodate battery cells 156 (see, for example, FIGS. 8 and 9). The array frame 158 may house one or more battery cells 156, with each pocket 175 capable of receiving a single battery cell.

The array frame 158 may additionally include one or more fastener housings 178. The fastener housings 178 are integrated features of the frame body 166 of the array frame 158. The fastener housings 178 may protrude from the frame arms 172 in a direction away from a center of the frame body 166. In a non-limiting embodiment, the fastener housings 178 are disposed at both the tops and bottoms of the frame arms 172 (e.g., near a junction between the frame arms 172 and the top wall 168 and at an opposite end of the frame arms 172 from the junction). Each fastener housing 178 may include an opening 180 for receiving a rod or other fastener for imparting compression across a battery assembly.

Figure 8:
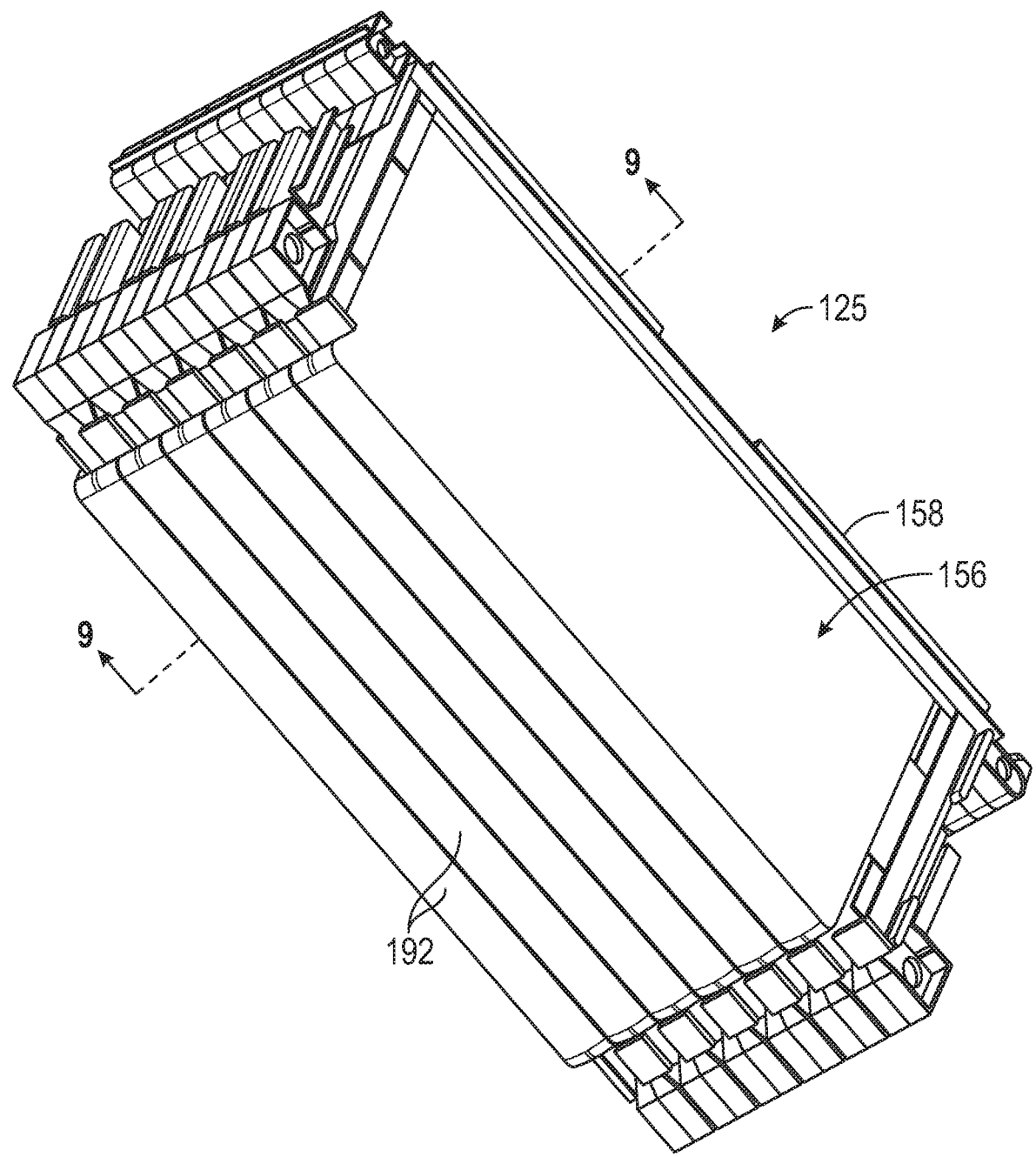
FIGS. 8 and 9 illustrate another battery assembly that includes a grouping of battery cells and interconnected array frames.
Figure 9:
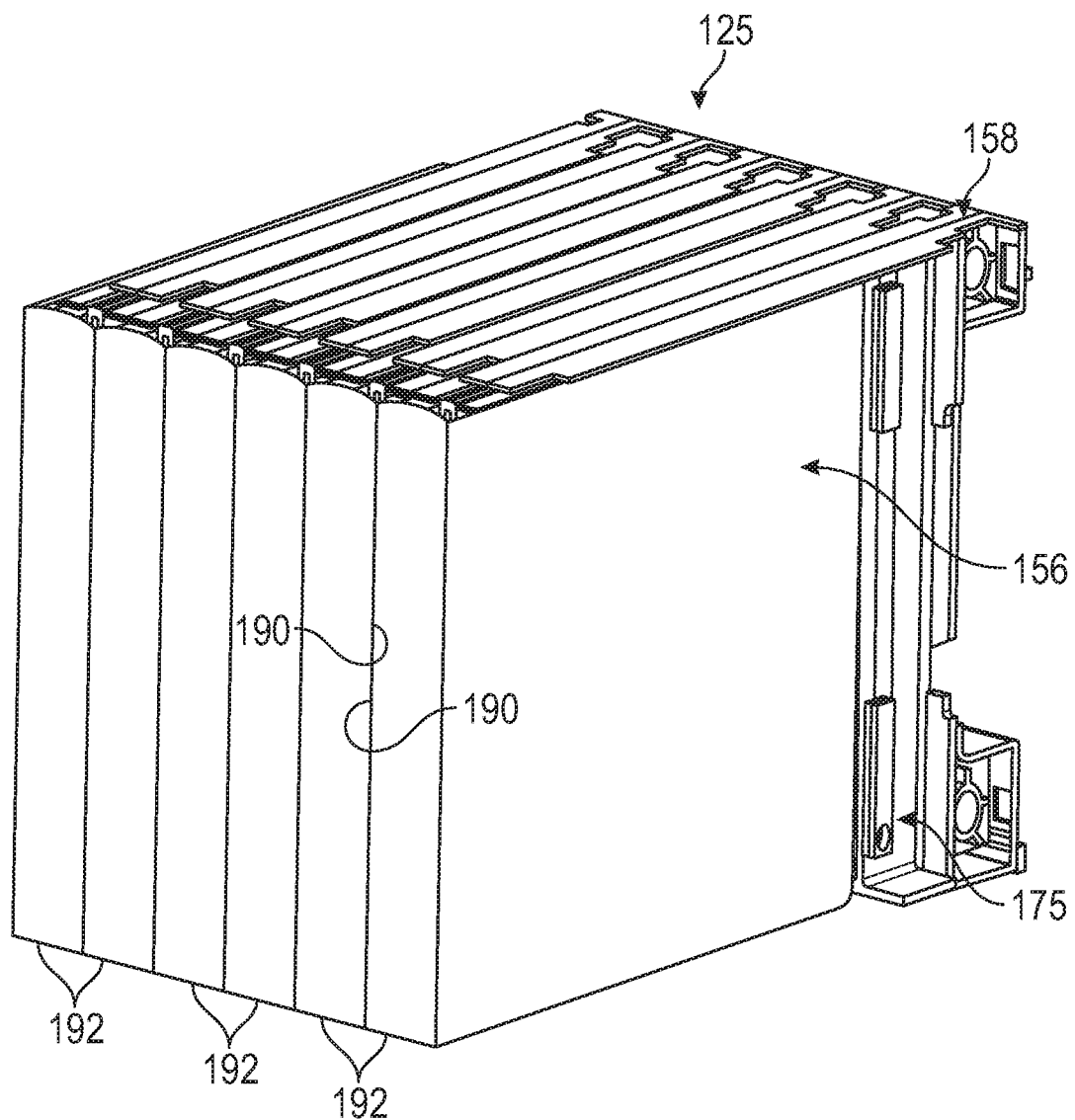

Referring now to FIGS. 8 and 9, a plurality of the array frames 158 may be stacked side-by-side to build a battery assembly 125. Each array frame 158 of the battery assembly 125 may accommodate two battery cells 156. Once received within the pockets 175 of the array frames 158, the battery cells 156 may contact one another along their side faces 190. Since the array frames 158 are three sided and therefore exclude any bottom wall or support beam, the battery cells 156 may be arranged such that at least one surface 192 of each battery cell 156 is completely exposed for contacting another structure, such as a heat dissipating structure. In an embodiment, the surface 192 is a bottom surface of the battery cell 156.

Figure 10:
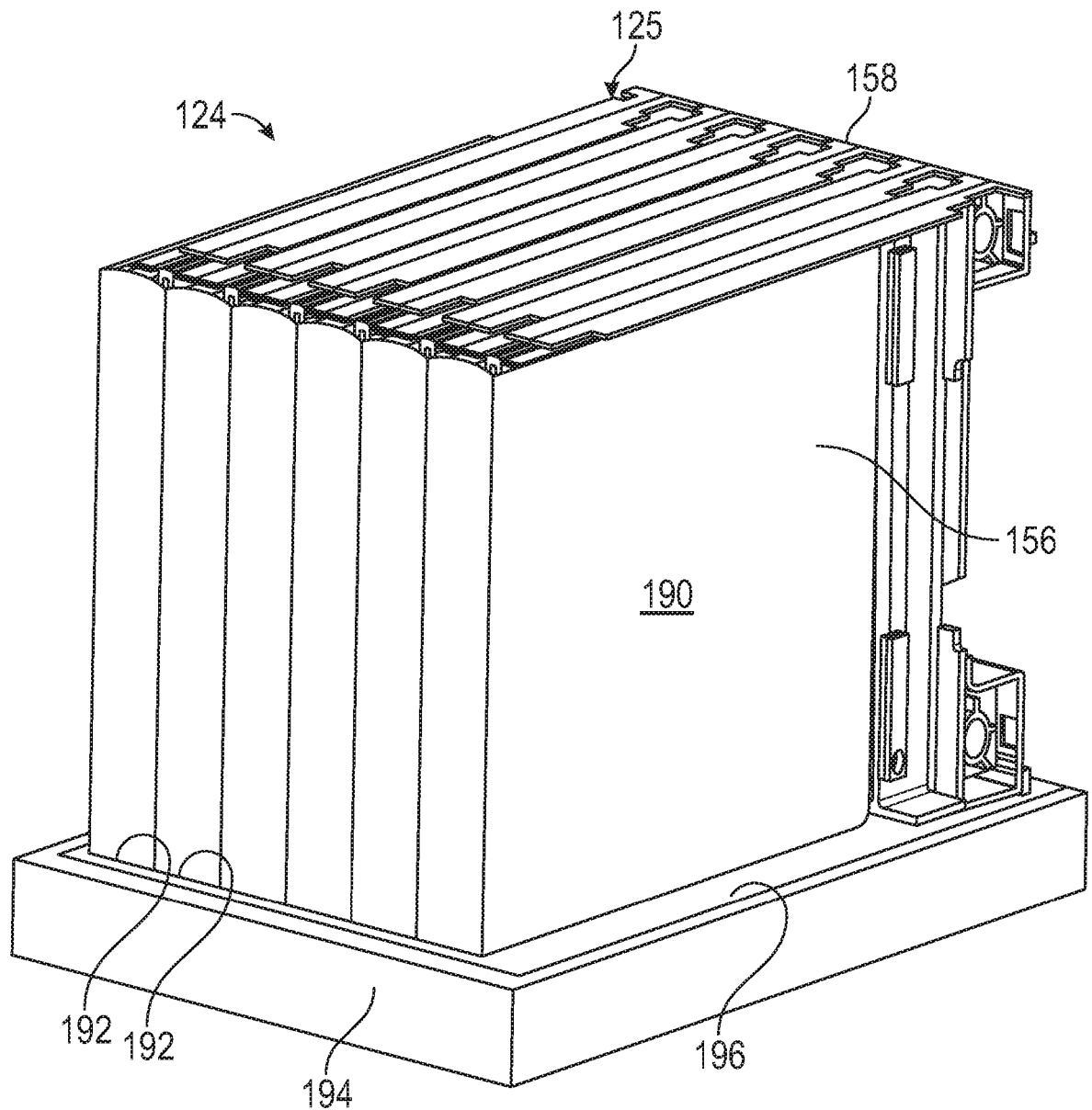
FIG. 10 is a cross-sectional view depicting portions of a battery pack that includes the battery assembly of FIGS. 8 and 9.

FIG. 10 illustrates portions of a battery pack 124 that includes the battery assembly 125 described above. The battery assembly 125, and thus the battery cells 156 and array frames 158, may be positioned over, or atop, a heat exchanger plate 194. In an embodiment, the exposed surfaces 192 of each battery cell 156 are contiguous with, or in direct contact with, with the heat exchanger plate 194. The heat exchanger plate 194 conducts heat out of the battery cells 156 to thermally manage the heat generated within the battery cells 156.

In another embodiment, a thermal interface material (TIM) 196 is disposed between the battery assembly 125 and the heat exchanger plate 194 such that the exposed surfaces 192 of the battery cells 156 are in direct contact with the TIM 196. The TIM 196 maintains thermal contact between the battery cells 156 and the heat exchanger plate 194, thereby increasing the thermal conductivity between these neighboring components during heat transfer events.

Like the embodiment discussed above with respect to FIG. 6, the heat generated by the battery cells 156 of the battery assembly 125 can be thermally managed without using thermal fins. This can be achieved by taking advantage of the internal component construction of the battery cells 156. For example, the battery cells 156 may include internal cells or folds that wrap around a horizontal axis that is generally parallel to the longitudinal axis A of each array frame 158. Each battery cell 156 therefore includes a thermally conductive path that runs parallel to the longitudinal axis A along the length of the side faces 190 of the battery cells 156 rather than laterally from battery cell-to-battery cell. By exposing the surfaces 192 through the array frames 158 (here, at the bottom of the array frames 158), the surfaces 192 can be positioned in direct contact with either the heat exchanger plate 194 or the TIM 196. Since the direct contact extends in the same direction of the thermal conductive path, heat can be efficiently transferred between the battery cells 156 and the heat exchanger plate 194 without requiring the use of thermal fins.

The exemplary battery assemblies of this disclosure take advantage of battery cell internal component construction to achieve sufficient heat transfer without using thermal fins positioned axially between the battery cells. Elimination of the thermals fins leads to cost reductions, weight reductions, and smaller packaging sizes due to the ability to position the battery cells closer together.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery pack, comprising:
a heat dissipating structure;
a first array frame positioned against the heat dissipating structure;
a battery cell retained by the first array frame and arranged so at least one surface of the battery cell is exposed by the first array frame and is contiguous with the heat dissipating structure; and
a second array frame connected to the first array frame,
wherein the first array frame includes a first pocket for receiving the battery cell and a second pocket for receiving a second battery cell,
wherein the battery cell and the second battery cell are contiguous at a first portion along their side faces and are non-contiguous at a second portion along their side faces.

2. The battery pack as recited in claim 1, wherein the heat dissipating structure is a heat exchanger plate.

3. The battery pack as recited in claim 1, wherein the heat dissipating structure is a thermal interface material (TIM).

4. The battery pack as recited in claim 3, wherein the TIM is disposed between the surface of the battery cell and a heat exchanger plate.

5. The battery pack as recited in claim 1, wherein the first array frame is rectangular shaped and includes a top wall, a support beam, and frame arms that extend between the top wall and the support beam.

6. The battery pack as recited in claim 5, wherein the support beam separates a first portion of the battery cell from a second portion of the second battery cell.

7. The battery pack as recited in claim 5, wherein the support beam includes a triangular shaped cross section.

8. The battery pack as recited in claim 5, wherein the top wall includes a first width and the support beam includes a second width that is a smaller width than the first width.

9. The battery pack as recited in claim 5, wherein the support beam includes a hard plastic material that is overmolded with a soft plastic material.

10. The battery pack as recited in claim 1, wherein the first array frame is three-sided and includes a top wall and frame arms that extend from the top wall.

11. The battery pack as recited in claim 1, wherein the surface of the battery cell is a bottom surface.

12. The battery pack as recited in claim 1, wherein the surface of the battery cell is completely uncovered by any portion of the first array frame.

13. The battery pack as recited in claim 1, comprising a battery assembly positioned against the heat dissipating structure, the battery assembly comprising the first array frame, the first and second battery cells, the second array frame, and a third battery cell retained by the second array frame.

14. The battery pack as recited in claim 1, wherein the first array frame extends along a longitudinal axis, and a thermally conductive path of the battery cell extends in parallel with the longitudinal axis along a length of a side face of the battery cell.

15. The battery pack as recited in claim 1, wherein the first array frame excludes a thermal fin positioned in contact with the battery cell.

16. A battery pack, comprising:
a heat dissipating structure;
a first array frame positioned against the heat dissipating structure;
a battery cell retained by the first array frame and arranged so at least one surface of the battery cell is exposed by the first array frame and is contiguous with the heat dissipating structure; and
a second array frame connected to the first array frame,
wherein the first array frame includes a first fastener housing, and a rod extends through a first opening of the first fastener housing.

17. The battery pack as recited in claim 16, wherein the rod extends through a second opening of a second fastener housing of the second array frame, thereby connecting the first array frame and the second array frame.

18. The battery pack as recited in claim 1, wherein the first array frame includes a first frame arm, a second frame arm, and a top wall that connects between the first frame arm and the second frame arm, wherein a terminal of the battery cell protrudes laterally outwardly from the first frame arm in a direction away from the second frame arm.

19. The battery pack as recited in claim 5, wherein the support beam spans an entire distance between the frame arms.

20. The battery pack as recited in claim 8, wherein the first width extends within a first plane and the second width extends within a second plane, wherein the second plane is parallel to the first plane.

21. A battery pack, comprising:
a heat dissipating structure;
a first array frame positioned against the heat dissipating structure;

a battery cell retained by the first array frame and arranged so at least one surface of the battery cell is exposed by the first array frame and is contiguous with the heat dissipating structure; and a second array frame connected to the first array frame, wherein the first array frame is rectangular shaped and includes a top wall, a support beam, and frame arms that extend between the top wall and the support beam, wherein the support beam includes a hard plastic material that is overmolded with a soft plastic material, wherein the hard plastic material is a high-density polyethylene (HDPE) and the soft plastic material is a urethane foam.

22. A battery pack, comprising:

a heat dissipating structure;

an first array frame positioned against the heat dissipating structure, wherein the first array frame includes a frame body having a first frame arm, a second frame arm, a top wall that extends from the first frame arm to the second frame arm, and a support beam that extends from the first frame arm to the second frame arm;

a first battery cell retained within a first pocket of the first array frame and arranged so at least one surface of the first battery cell is exposed by the first array frame and is contiguous with the heat dissipating structure;

a second battery cell retained within a second pocket of the first array frame and arranged so at least one surface of the second battery cell is exposed by the first array frame and is contiguous with the heat dissipating structure, wherein the support beam separates portions of a first side surface of the first battery cell and a second side surface of the second battery cell;

a second array frame received against the first array frame; and a rod configured for connecting the second array frame to the first array frame.

* * * * *